US009942293B2

(12) United States Patent
Ozzie et al.

(10) Patent No.: US 9,942,293 B2
(45) Date of Patent: *Apr. 10, 2018

(54) COMMUNICATION SYSTEM

(71) Applicant: Microsoft Technology Licensing, LLC, Redmond, WA (US)

(72) Inventors: Raymond Edward Ozzie, Seattle, WA (US); Howard Benjamin Nager, Arlington, MA (US); Neil Bousquet Ozzie, Seattle, WA (US); Matthew Jason Pope, Seattle, WA (US); Ransom Lloyd Richardson, Beverly, MA (US); Richard Zack Speyer, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,594

(22) Filed: Apr. 11, 2016

(65) Prior Publication Data

US 2016/0226940 A1 Aug. 4, 2016

Related U.S. Application Data

(63) Continuation of application No. 13/648,399, filed on Oct. 10, 2012, now Pat. No. 9,313,633.

(Continued)

(51) Int. Cl.
*G06F 15/16* (2006.01)
*H04L 29/06* (2006.01)
(Continued)

(52) U.S. Cl.
CPC ........ *H04L 65/4084* (2013.01); *H04L 65/403* (2013.01); *H04N 7/157* (2013.01); *H04N 21/4788* (2013.01); *H04W 4/206* (2013.01)

(58) Field of Classification Search
USPC ................................. 709/231, 217, 200, 204
See application file for complete search history.

(56) References Cited

U.S. PATENT DOCUMENTS 7,433,327 B2 * 10/2008 Harville ................. H04N 7/142
348/E7.079
7,519,667 B1 * 4/2009 Capps ................... H04L 12/582
709/203

(Continued)

FOREIGN PATENT DOCUMENTS

CN 1551631 A 12/2004
CN 1801785 A 7/2006
(Continued)

OTHER PUBLICATIONS

"First Office Action and Search Report Issued in Chinese Patent Application No. 201280049670.1", dated Oct. 9, 2016, 15 Pages.
(Continued)

*Primary Examiner* — El Hadji Sall

(57) ABSTRACT

Methods and systems for integrated communications are pro-vided. In one embodiment, a user input is received via a user interface. Media data is received in response to receiving the user input. The media data is streamed to one or more communication system users. In some embodiments, the media data is posted to a shared virtual space associated with a communication system channel. Other methods and systems are described.

20 Claims, 7 Drawing Sheets

Related U.S. Application Data

(60) Provisional application No. 61/545,346, filed on Oct. 10, 2011.

(51) Int. Cl.
*H04W 4/20* (2018.01)
*H04N 7/15* (2006.01)
*H04N 21/4788* (2011.01)

(56) References Cited

U.S. PATENT DOCUMENTS

| | | | |
|---|---|---|---|
| 8,625,434 B2* | 1/2014 | Morse | G10L 19/00 348/14.01 |
| 8,654,953 B2 | 2/2014 | Boss et al. | |
| 2005/0132288 A1 | 6/2005 | Kirn et al. | |
| 2007/0028111 A1* | 2/2007 | Covely | G06F 21/51 713/176 |
| 2008/0019440 A1 | 1/2008 | Lee et al. | |
| 2008/0234005 A1 | 9/2008 | Schindler et al. | |
| 2009/0144391 A1 | 6/2009 | Jung et al. | |
| 2010/0040349 A1 | 2/2010 | Landy | |
| 2010/0096282 A1 | 4/2010 | Roberts | |
| 2011/0022620 A1 | 1/2011 | Woods | |
| 2011/0109717 A1 | 5/2011 | Nimon et al. | |
| 2012/0069131 A1* | 3/2012 | Abelow | G06Q 10/067 348/14.01 |

FOREIGN PATENT DOCUMENTS

| | | |
|---|---|---|
| CN | 101035248 A | 9/2007 |
| CN | 101286810 A | 10/2008 |
| CN | 101690206 A | 3/2010 |
| CN | 101827271 A | 9/2010 |
| EP | 1162806 A2 | 12/2001 |
| EP | 2237533 A1 | 10/2010 |
| JP | 8297624 A | 11/1996 |
| JP | 2001218177 A | 8/2001 |
| JP | 2001511991 A | 8/2001 |
| JP | 2002202941 A | 7/2002 |
| JP | 2005229463 A | 8/2005 |
| JP | 2006074538 A | 3/2006 |
| JP | 2007266992 A | 10/2007 |
| JP | 2008172582 A | 7/2008 |
| JP | 2008236553 A | 10/2008 |
| RU | 2005120378 A | 1/2006 |
| RU | 2335854 C2 | 10/2008 |
| WO | 2011090815 A2 | 7/2011 |

OTHER PUBLICATIONS

"Office Action Issued in Russian Patent Application No. 2014118683", dated Sep. 12, 2016, 4 Pages. (W/O English Translation).
"Office Action Issued in Japanese Patent Application No. 2014-535809", dated Aug. 2, 2016, 5 Pages. (W/o English Translation).
"Notice of Allowance Issued in Australian Patent Application No. 2012323326", dated Jul. 1, 2016, 2 Pages.
"Office Action Issued in European Patent Application No. 12839847.6", dated Jul. 27, 2016, 6 Pages.
"Notice of Allowance Issued in Russian Patent Application No. 2014118683", dated Jan. 11, 2017, 11 Pages. (W/o English Translation).
"Final Office Action Issued in U.S Appl. No. 13/648,399", dated Jul. 15, 2015, 8 Pages.
"Non-Final Office Action Issued in U.S Appl. No. 13/648,399", dated Jan. 29, 2015, 8 Pages.
"Notice of Allowance Issued in U.S Appl. No. 13/648,399", dated Dec. 7, 2015, 5 Pages.
"Office Action Issued in Australian Patent Application No. 2012323326", dated Mar. 22, 2016, 3 Pages.
"International Preliminary Report on Patentability Issued in PCT Application No. PCT/US2012/059493", dated Apr. 24, 2014, 9 Pages.
"International Search Report & Written Opinion Issued in PCT Application No. PCT/US2012/059493", dated Dec. 11, 2012, 11 Pages.
"Second Office Action Issued in Chinese Patent Application No. 201280049670.1", dated Jul. 3, 2017, 6 Pages.
"Office Action Issued in Israel Patent Application No. 231848", dated Mar. 12, 2017, 2 Pages.
"Third Office Action Issued in Chinese Patent Application No. 201280049670.1", dated Oct. 24, 2017, 5 Pages.
"Office Action Issued in Australian Patent Application No. 2016244251", dated Dec. 8, 2017, 2 Pages.
"Office Action Issued in Japanese Patent Application No. 2017-022303", dated Jan. 30, 2018, 7 Pages.

* cited by examiner

COMMUNICATION SYSTEM

CROSS-REFERENCE TO RELATED APPLICATIONS

This application claims the benefit of U.S. patent application Ser. No. 13/648,399, entitled "COMMUNICATION SYSTEM" filed on Oct. 10, 2012 which claims the benefit of U.S. provisional patent application Ser. No. 61/545,346, entitled "ENHANCED COMMUNICATION AND INFORMATION SHARING," filed on Oct. 10, 2011, both of which are herein incorporated by reference in their entirety.

TECHNICAL FIELD

The present disclosure relates to communications systems, and more particularly relates to multi-data type communications systems.

BACKGROUND OF THE DISCLOSURE

A variety of communications systems and mechanisms are frequently used in both business related and personal interactions. The communications systems that are available can often shape the way people interact with one another. Communication and expression may often have to be forced through an ineffective communication medium. At times, the restrictions provided by the modality of communication, such as audio only, text only, two party only, synchronousonly or asynchronousonly, etc., can place limitations and restrictions on the expression of ideas. The result may be that individuals may be left with an incomplete or inadequate ability for expression, communication or interaction.

SUMMARY OF THE DISCLOSURE

According to a first implementation, a method may include receiving a user input via a user interface. The method may also include receiving media data in response to receiving the user input. The method may also include streaming the media data to one or more communication system users. The method may further include posting the media data to a shared virtual space associated with a communication system channel.

One or more of the following features may be included. The user input may include an associated input duration time period. Receiving the media data may include receiving the media data for the input duration. The method may also include receiving an input modification. Receiving the media data in response to the input modification may include receiving the media data for a time period greater than the input duration.

The media data may include audio media data. The media data may include visual media data. Receiving the media data in response to the input may include receiving digital image data. Receiving the media data in response to the input modification may include receiving video data.

Streaming the media data may include streaming the media data to at least a second communication system user. Posting the media data may include simultaneously posting the media data to the shared virtual space associated with the communication system channel Streaming the media data may include transmitting the media data as low latency packetized data transmissions.

The method may also include receiving a transmission from a second communication system user. Receiving the transmission from the second communication system user may not time-wise overlap with the streaming the media data. Posting the media data may include sequentially posting the media data with respect to a post associated with the transmission from the second communication system user. Receiving the transmission from the second communication system user may time-wise overlap with the streaming the media data. Streaming the media data may include combining the media data and the transmission from the second communication system user as a multi-directional streaming media data transmission. Receiving the transmission from the second communication system user may time-wise overlap with the streaming the media data. Posting the media data may include posting the media data and the transmission from the second communication system user as a combined media data post.

According to another implementation, a computer program product may include a computer readable medium having a plurality of instructions stored on it. When executed by a processor, the instructions may cause the processor to perform operations including receiving a user input via a user interface. The operations may also include receiving media data in response to receiving the user input. The operations may also include streaming the media data to one or more communication system users. The operations may further include posting the media data to a shared virtual space associated with a communication system channel.

One or more of the following features may be included. The user input may include an associated input duration time period. Receiving the media data may include receiving the media data for the input duration. Instructions may also be included for receiving an input modification. Receiving the media data in response to the input modification may include receiving the media data for a time period greater than the input duration.

The media data may include audio media data. The media data may include visual media data. Receiving the media data in response to the input may include receiving digital image data. Receiving the media data in response to the input modification may include receiving video data.

Streaming the media data may include streaming the media data to at least a second communication system user. Posting the media data may include simultaneously posting the media data to the shared virtual space associated with the communication system channel. Streaming the media data may include transmitting the media data as low latency packetized data transmissions.

Instructions may also be included for receiving a transmission from a second communication system user. Receiving the transmission from the second communication system user may not time-wise overlap with the streaming the media data. Posting the media data may include sequentially posting the media data with respect to a post associated with the transmission from the second communication system user. Receiving the transmission from the second communication system user may time-wise overlap with the streaming the media data. Streaming the media data may include combining the media data and the transmission from the second communication system user as a multi-directional streaming media data transmission. Receiving the transmission from the second communication system user may time-wise overlap with the streaming the media data. Posting the media data may include posting the media data and the transmission from the second communication system user as a combined media data post.

According to another implementation a computing system may include at least one processor. The at least one processor may be configured for receiving a user input via a user interface. The at least one processor may also be configured for receiving media data in response to receiving the user input. The at least one processor may also be configured for streaming the media data to one or more communication system users. The at least one processor may further be con-figured for posting the media data to a shared virtual space associated with a communication system channel.

One or more of the following features may be included. The user input may include an associated input duration time period. Receiving the media data may include receiving the media data for the input duration. The at least one processor may be further configured for receiving an input modification. Receiving the media data in response to the input modification may include receiving the media data for a time period greater than the input duration.

The media data may include audio media data. The media data may include visual media. Receiving the media data in response to the input may include receiving digital image data. Receiving the media data in response to the input modification may include receiving video data.

Streaming the media data may include streaming the media data to at least a second communication system user. Posting the media data may include simultaneously posting the media data to the shared virtual space associated with the communication system channel. Streaming the media data may include transmitting the media data as low latency packetized data transmissions.

The at least one processor may be further configured for receiving a transmission from a second communication system user. Receiving the transmission from the second communication system user may not time-wise overlap with the streaming the media data. Posting the media data may include sequentially posting the media data with respect to a post associated with the transmission from the second communication system user. Receiving the transmission from the second communication system user may time-wise overlap with the streaming the media data. Streaming the media data may include combining the media data and the transmission from the second communication system user as a multi-directional streaming media data transmission. Receiving the transmission from the second communication system user may time-wise overlap with the streaming the media data. Posting the media data may include posting the media data and the transmission from the second communication system user as a combined media data post.

According to another implementation, a method may include receiving a plurality of media items from a communication system. The plurality of media items may include at least audio media items and visual media items. The method may also include providing a user interface including a time-wise sequence display of the audio media items and a time-wise sequence display of the visual media items. The method may also include accessing the audio media item including sequencing the display of the visual media items based on the display of the audio media items. The method may further include accessing the visual media items including sequencing the display of the visual media items independently of the display of audio media items.

One or more of the following features may be included. The audio media items may include a plurality of audio segments corresponding to respective audio transmissions by one or more users associated with a channel of the communication system. At least a portion of the audio segments may correspond to a multi-party conversation. The multi-party conversation may include an ongoing multi-party conversation. Accessing the audio media items may include accessing one or more audio segments associated with a prior portion of the ongoing multi-party conversation. Accessing the audio media items may include accessing a streaming audio sequence associated with a current portion of the ongoing multi-party conversation. Each audio segment may include an associated identifier of a creator of the audio segment.

Receiving the visual media item may include dis-playing the visual media item based on, at least in part, a minimum display time for received visual media items.

According to another implementation, a computer program product may include a non-transitory computer readable medium having a plurality of instructions stored on it. When executed by a processor the instructions may cause the processor to perform operations include receiving a plurality of media items from a communication system, the plurality of media items including at least audio media items and visual media items. The operations may also include providing a user interface including a time-wise sequence display of the audio media items and a time-wise sequence display of the visual media items. The operations may also include accessing the audio media item including sequencing the display of the visual media items based on the display of the audio media items. The operations may further include accessing the visual media items including sequencing the display of the visual media items independently of the display of audio media items.

One or more of the following features may be included. The audio media items may include a plurality of audio segments corresponding to respective audio transmissions by one or more users associated with a channel of the communication system. At least a portion of the audio segments may correspond to a multi-party conversation. The multi-party conversation may include an ongoing multi-party conversation. Accessing the audio media items may include accessing one or more audio segments associated with a prior portion of the ongoing multi-party conversation. Accessing the audio media items may include accessing a streaming audio sequence associated with a current portion of the ongoing multi-party conversation. Each audio segment may include an associated identifier of a creator of the audio segment.

Receiving the visual media item may include dis-playing the visual media item based on, at least in part, a minimum display time for received visual media items.

According to another implementation, a computing system includes at least one processor. The at least one processor may be configured for receiving a plurality of media items from a communication system, the plurality of media items including at least audio media items and visual media items. The at least on processor may also be configured for providing a user interface including a time-wise sequence display of the audio media items and a time-wise sequence display of the visual media items. The at least one processor may also be configured for accessing the audio media item including sequencing the display of the visual media items based on the display of the audio media items. The at least one processor may further be configured for accessing the visual media items including sequencing the display of the visual media items independently of the display of audio media items.

One or more of the following features may be included. The audio media items may include a plurality of audio segments corresponding to respective audio transmissions by one or more users associated with a channel of the communication system. At least a portion of the audio segments may correspond to a multi-party conversation. The multi-party conversation may include an ongoing multi-party conversation. Accessing the audio media items may include accessing one or more audio segments associated with a prior portion of the ongoing multi-party conversation. Accessing the audio media items may include accessing a streaming audio sequence associated with a current portion of the ongoing multi-party conversation. Each audio segment may include an associated identifier of a creator of the audio segment.

Receiving the visual media item may include dis-playing the visual media item based on, at least in part, a minimum display time for received visual media items.

The details of one or more implementations are set forth in the accompanying drawings and the description below. Other features will become apparent from the description, the drawings, and the claims.

DETAILED DESCRIPTION OF THE INVENTION

Figure 1:
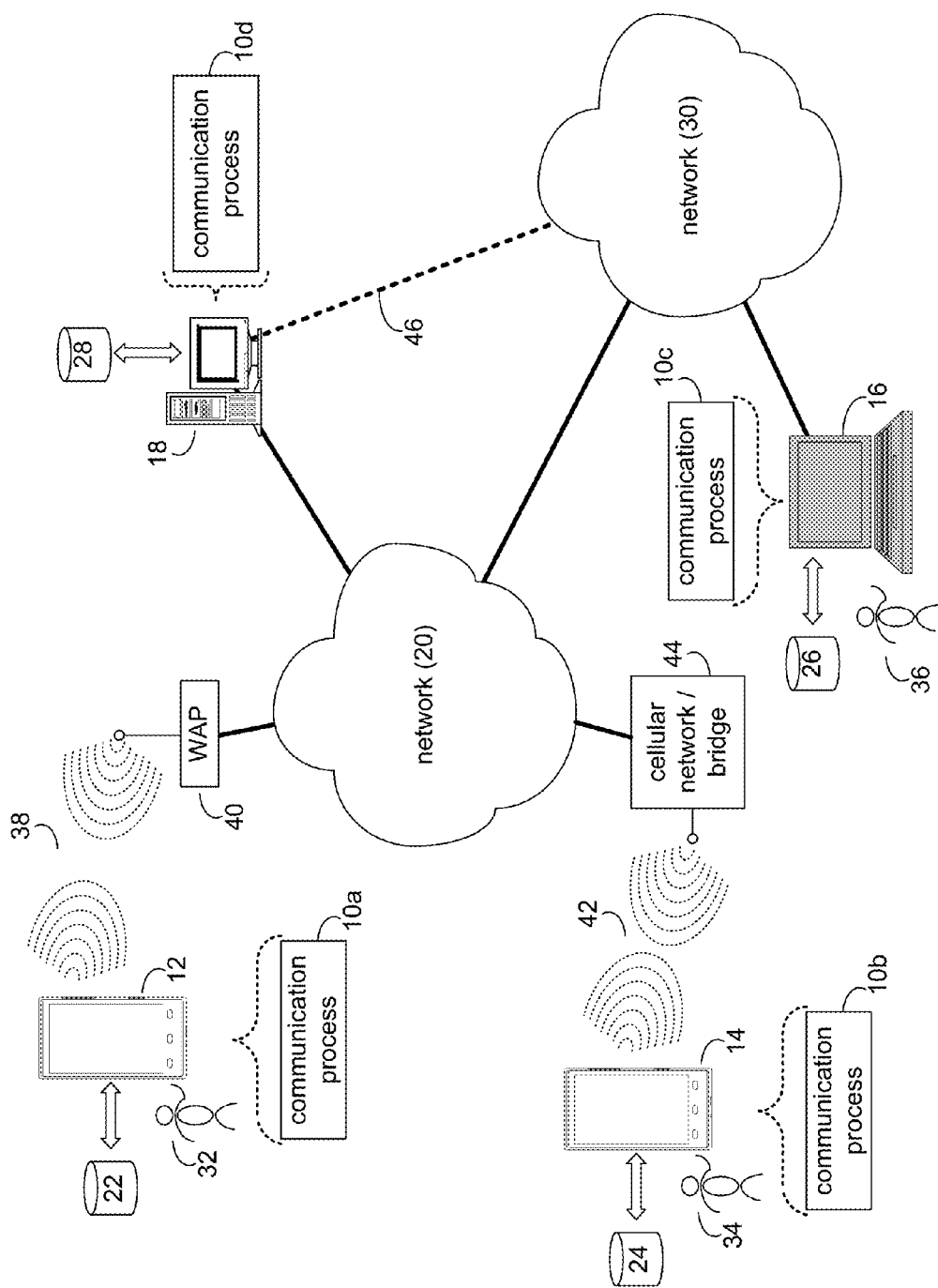
FIG. 1 diagrammatically depicts a communication process coupled to a distributed computing network.

In general, a communication system may be provided that may allow users to communicate with one another using a variety of different media types in a multi-temporal manner, and using various devices, such as mobile computing devices (e.g., smartphone, tablet computing devices, netbooks, etc.), personal computers (e.g., notebook computers, desktop computers, etc.), gaming consoles, set top boxes, special purpose computing devices, or other suitable devices. An example of such a communication system is described in U.S. patent application Ser. No. 13/472,639, filed on 16 May 2012, and entitled "Communications System", the entire dis-closure of which is incorporated herein by reference. For example, in some embodiments the communication system may allow users of the system to communicate with one another using audio, visual, or other media types. Audio media types may include synchronous and/or asynchronous voice messages. For example, synchronous voice messages may include multi-directional live audio exchanges, such as voice-over-IP exchanges, or exchanges using other varieties of telephony. In a similar manner, an example of a synchro-nous visual media type may include a multi-party video conference (e.g., which may be effectuated using video-over-IP or other suitable video conferencing technology), streaming video broadcast by one user to other user, etc. In some embodiments, during the course of synchronous audio and/or visual communications between users of the communication system other media types may be shared by the users of the communication system. For example, during the course of an audio-based conversation between users of the communication system, the users may share documents, pictures, video clips, text messages, etc. In some embodiments, the communication system may allow the users of the communication system to consume the shared media or documents while also engaged in an audio or video conversation/communication with other users of the communication system. Further, in some embodiments the communication system may allow users to synchronously, and/or asynchronously share media or documents without otherwise being engaged in an audio and/or video conversation/communication with other users of the communication system In some embodiments, in addition, or as an alternative, to synchronous communications, the communication system may allow for asynchronous exchanges between users of the communication system. Asynchronous exchanges may include, for example, exchanges between users of the communication system who are not actively participating in the communication at the same time. For example, a first user may post communications while other users of the communication system are not online or actively "listening" The other users, who were not online when the first user posted his communications, may consume the first user's posts at a later time. Various media types may be used in connection with such asynchronous communications. For example, the first user may post audio or video clip media types, documents, pictures, text messages, etc.

In some embodiments, asynchronous exchanges may occur between users of the communication system who may each be online at the same time. For example, the users may exchange (and/or one user may send and one or more other users may receive) various communications, such as audio files (e.g., as streaming audio, discrete received audio clips, etc.), video files (e.g., as streaming video, discrete received video clips, etc.), text messages, documents, pictures, or any other suitable media types. In an example of such an embodiment, even when the various parties to the communication may be online at the same time, the asynchronous nature of the exchanges may not necessitate an immediate consumption of a communication from one user to another, and/or may not necessitate an immediate response from on user to another. As such, a communication including an asynchronous exchange may be a less intrusive or demanding interaction that a purely synchronous communication.

In addition to purely synchronous or purely asynchronous exchanges, a communication system may support exchanges that include synchronous and asynchronous components and/or that may transition between synchronous and synchronous exchanges through the course of a single interaction. For example, an interaction between users of the communication system may include synchronous components, such as voice-over-IP exchanges, as well as asynchronous exchanges, such as text messages, exchanged video clips or documents, etc. In an example, a communication between three users of the communication system may begin with a first user sending a document to the other two users, and may give rise to an exchange of text messages (e.g., in a form similar to SMS message, or instant message chat, etc.) between the users. Further one user may transmit an audio message to the other two users (e.g., as a discrete audio file or as streaming audio content). In an embodiment, the communication system may allow one or both of the other two users to engage the audio message from the first user by establishing a three way conference call. Further, one or the users may drop off of active engagement in the conference call, e.g., to become a passive listener of the ongoing conversation between the remaining two users participating in a bidirectional conversation. For example, dropping off of active involvement in the conversation may allow the third user to attend to another matter, or otherwise direct their attentions. While participating as a passive listener of the conversation between the first two users, the third user may participate in the exchange, e.g., by sending text messages or the like to the other two users. Further, one of the remaining users on the voice call may also leave the call, for example to devote all or a portion of their attention to another matter. The first user may continue to transmit audio messages to the other two participants (e.g., as streaming audio that may be listened to by the online users or transmitted audio files that may be consumed by the users when they desire), and the other two users may similarly transmit various media exchanges, such as audio, video, pictures, text messages, documents, etc., to the other participants of the exchange.

According to one aspect, the communication system may utilized a shared virtual space. In an embodiment, the shared virtual space may include a virtual space (such as a shared online folder, etc.) that may be allocated to each channel of the communication system. In an embodiment, a channel of the communication system may include a defined default set of participants for communications. Each channel of the communication system may include one or more calls associated with the channel. Each of the calls associated with a given channel may include the same default set of participants. In some embodiments, the participants of a call on a given channel may vary from the default participant set, e.g., to include greater or fewer actual participants. For example, a call on a given channel may not require participation by all of the default participants of the channel. Similarly, a user may participate in a call on a channel even if the user is not a member of the default participant set for the channel. In some embodiments, the user who is not a member of the default participant set for the channel may have different access permissions relative to the shared space as compared to members of the default participant set (e.g., the user may only access the one call that he participated in, etc.). Each call associated with a channel on the communication system may generally include a set of interactions between the default participants of the channel. For example, the set of interactions may include a file (such as a document, or a video file) sent to the other participants on the channel. In another example, the set of interactions may include a multi-participant video conference, along with a plurality of shared documents, and text messages from one or more users to the other users. Various additional combinations of media type and numbers of exchanges may be included within a set of interactions defining a call. In general, a call may include one or more generally contemporaneous exchanges that may be considered a single time bounded interaction.

In an embodiment, the shared virtual space may provide a durable record of the calls taking place on a given channel. For example, each of the exchanges may be stored on the shared virtual space. For example, synchronous voice conversations (e.g., which may occur as voice-over-IP exchanges) may be stored as audio files, video conferences may be stored as video files, other media types that may be exchanged by users of the communication system may be stored in a variety of formats depending upon the media type. In an embodiment, one or more of the participants defining the channel on the communication system may access the shared virtual space and access the exchanges associated with one or more calls associated with the channel.

Referring to FIG. 1, there is shown communication process 10a through 10d (which may collectively and/or generally be referred to as communication process 10) that may reside on and may be executed by one or more client electronic devices (e.g., client electronic devices 12, 14, 16, etc.) and/or by server computer 18. The one or more client electronic devices 12, 14, 16 and/or server computer 18 may be connected to network 20 (e.g., the Internet, a local area net-work, a private government network, or other network). Examples of client electronic devices may include mobile computing devices (e.g., smart phones 12, 14, tablet computing devices, data enabled cellular telephones, network connected personal digital assistants, or the like), personal computing devices (e.g., notebook computer 16, desk top computers, gaming consoles, and the like), network connected television devices and/or set-top boxes, networked camera devices, networked embedded computing devices, as well as various additional/alternative network connectable computing devices. Examples of server computer 18 may include, but are not limited to: a personal computer, a server computer, a series of server computers, a mini computer, a mainframe computer, cloud computing services that may include virtualized instances of server computers, and the like.

As will be described in greater detail below, communication process 10 may generally provide an integrated communication system that may allow synchronous and/or asynchronous interactions between small and/or large groups of users via multiple data and/or media types. Various different types of information, ideas, and subject matter may be best communicated and shared in different modalities. As such, communication process 10 may allow for rich interactions between users through the concurrent exchange, sharing, and/or consumption of audio messages and conversations, video content, text-based information, pictures, and the like. Communication process 10 may allow multiple different data and media types to be exchanged between users and consumed by the users by providing an integrated user experience.

The instruction sets and subroutines of concept development process 10, which may include one or more software modules, and which may be stored on storage device (e.g., one or more of storage devices 22, 24, 26, 28) coupled to one or more of client electronic devices 12, 14, 16, and/or server computer 18, may be executed by one or more processors (not shown) and one or more memory modules (not shown) incorporated into client electronic devices 12, 14, 16 and/or server computer 18. Storage devices 22, 24, 26, 28 may include but is not limited to: a hard disk drive; a solid state drive, a tape drive; an optical drive; a RAID array; a random access memory (RAM); a read-only memory (ROM), a flash memory device, or the like.

Each client electronic devices 12, 14, 16 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United States, other countries, or both.) Additionally, client electronic devices 12, 14, 16 may allow for various data capture and rendering functionality, such as audio capture, audio streaming, and audio playback, video capture, video streaming, and video playback, text input and text display, and image capture and image display. Various different client electronic devices may further provide additional/alternative functionality, including, but not limited to, sensor functionality including, but not limited to location (e.g., via GPS data acquisition or the like).

Further, while not shown, client electronic devices 12, 14, 16 may execute various applications, including, but not limited to web browser applications (e.g., Safari®, Chrome®, Internet Explorer®; Safari is a trademark of Apple Inc. in the United States, other countries, or both; Chrome is a trademark of Google Inc. in the United States, other countries, or both; Internet Explorer is a trademark of Microsoft Corporation in the United Sates, other countries, or both), text messaging applications, instant messaging application, audio, video and/or image capture and editing application, social networking application (e.g., Facebook application, LinkedIn application, etc.). Various additional/alternative applications may similarly be executed by one or more of client devices 12, 14, 16. Communication process 10a, 10b, 10c may be a stand-alone application and/or may be a module and/or component of one or more additional applications executed by client electronic devices 12, 14, 16. Additionally/alternatively, communication process 10a, 10b, 10c may interact with one or more applications executed by client electronic devices 12, 14, 16.

In some embodiments, server computer 18 may be an internet-connected server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) In some embodiments, server computer 18 may execute a web server application, examples of which may include but are not limited to: Microsoft IIS, Novell Webserver™, or Apache® HTTP Server, Apache® Tomcat® application server, that allows for HTTP (i.e., HyperText Transfer Protocol) access to server computer 18 via network 20 (Webserver is a trademark of Novell Corporation in the United States, other countries, or both; and Apache and Tom-cat are registered trademarks of Apache Software Foundation in the United States, other countries, or both). In some embodiments, the server computer be implemented as cloud services, such as Amazon Web Services and/or Microsoft Windows Azure. Network 20 may be connected to one or more secondary networks (e.g., network 30), examples of which may include but are not limited to: a local area network; a wide area network; or an intranet, for example.

In some embodiments, server computer 18 may execute various applications in addition to communication process 10d. For example, server computer 18 may execute data storage systems, including but not limited to database systems. Server computer 18 may also execute, for example, a Voice over IP system and/or unified telephony system (e.g., which may be provided by the Asterisk open source platform sponsored by Digium, Inc., Free SWITCH open source tele-phony platform or other suitable communication application and/or platform. Various additional and/or alternative applications may be executed by server computer 18.

Consistent with various embodiments, communication process 10 may include a client-side process executed by one or more of client electronic devices 12, 14, 16. Further, in some embodiments, communication process 10 may include a server-side process executed by server computer 18. For example, as a server-side process, one or more users (e.g., users 32, 34, 36) may access the server-side process (e.g., communication process 10d) via a web browser, or other suitable application (e.g., which may include an application that may provide functionality in addition to accessing server-side communication process 10d). Additionally, in some embodiments, communication process 10 may include a hybrid server-client process with some of the functionality of communication process 10 executed by one or more of client electronic devices 12, 14, 16 and some of the functionality of communication process 10 executed by server computer 18. In various hybrid embodiments, one or more of client-side communication processes 10a, 10b, 10c may include stand-alone communication applications and/or may include modules or features of other applications, and/or may otherwise integrate with and/or interact with one or more other applications (e.g., which may provide functionality in addition to functionality provided by one or more of communication applications 10a, 10b, and/or 10c).

Users 32, 34, 36 may access communication process 10 via the client electronic device executing communication process 10 (e.g., smart phone 12 executing communication process 10a, smart phone 14 executing communication process 10b, notebook computer 16 executing communication process 10c). Using communication process 10, one or more of users 32, 34, 36 may interact with one another using a variety of data types in a synchronous and/or an asynchronous manner, allowing for a rich and dynamic exchange of ideas and information between the users.

The various client electronic devices may be directly or indirectly coupled to network 20 (or network 30). For example, smart phone 12 is shown wirelessly coupled to network 20 via wireless communication channel 38 established between smart phone 12 and wireless access point (i.e., WAP) 40, which is shown directly coupled to network 14. WAP 40 may be, for example, an IEEE 802.11a, 802.11b, 802.11g, Wi-Fi, and/or Bluetooth device that is capable of establishing wireless communication channel 38 between smart phone 12 and WAP 40. Smart phone 14 is shown wirelessly coupled to network 14 via wireless communication channel 42 established between smart phone 14 and cellular network/bridge 44, which is shown directly coupled to network 14. Notebook computer 16 is shown coupled to network 30 (e.g., which may further be coupled to network 20 and/or server computer 18 via connection 46) via a hardwired connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

One or more example embodiments may be described that may illustrate particular features and/or aspects of the disclosure. For the purpose of description, reference may be made to communication process 10a executed by smart phone 12 and/or in connection with user 32. It will be understood, however, that such reference is intended only for the purpose of explanation, and should not be construed as a limitation on the present disclosure. Other instantiations of the communication process, client electronic devices, and/or users may be equally utilized.

According to one aspect, communication process 10 may enable different modes for a user to create audio and/or visual media content, and facilitate transitioning between the different modes of creation by the user. For example, in a first mode the user (e.g., user 32 via smart phone 12) may create burst of audio that may be sent to other users of the communication system and posted to a shared virtual space associated with a channel of the communication system. In such a mode the user may create and share (e.g., by way of trans-mission to other users and posting to the shared virtual space), for example, short voice messages or audio clips, such as an odd noise being made by a car, or brief sound bite from a concert. In an embodiment, a first user input via a user inter-face associated with smart phone 12 may allow the user to create and share the audio burst. Further, communication process 10 may also permit the user to create and share longer audio sequences, such as detailed description of an idea or an audio conversation with another user of the communication system. In an embodiment, the user may transition from the short audio burst mode to the more extended or length audio mode by providing a modification to the first user input. According to some embodiment, communication process 10 may similarly allow the user to create visual content in various modes, such as individual images, image bursts (e.g., which may provide a short animation in some embodiments), and video content, with similar modified inputs. As such, the user may be able to create and share different types of media through different modes using relatively simple and intuitive inputs. While example devices have been described as participating in interactions via the communication system, various additional devices may also be utilized. In some embodiments, devices used in connection with the communication system may include device that enable full participation in communication (e.g., may both create interactions such as audio, video, pictures, text, etc., and consume interactions such as playing back audio and/or video, displaying pictures and text, etc.) and/or may enable partial participation in communications (e.g., Wi-Fi enabled camera which may create and transmit picture or video interactions but may not necessarily be able to consume interactions or web feeds that may be configured to publish photos, text, audio, video, etc. from the feed to the communication channel). Various additional/alternative embodiments and devices may be similarly utilized.

Figure 2:
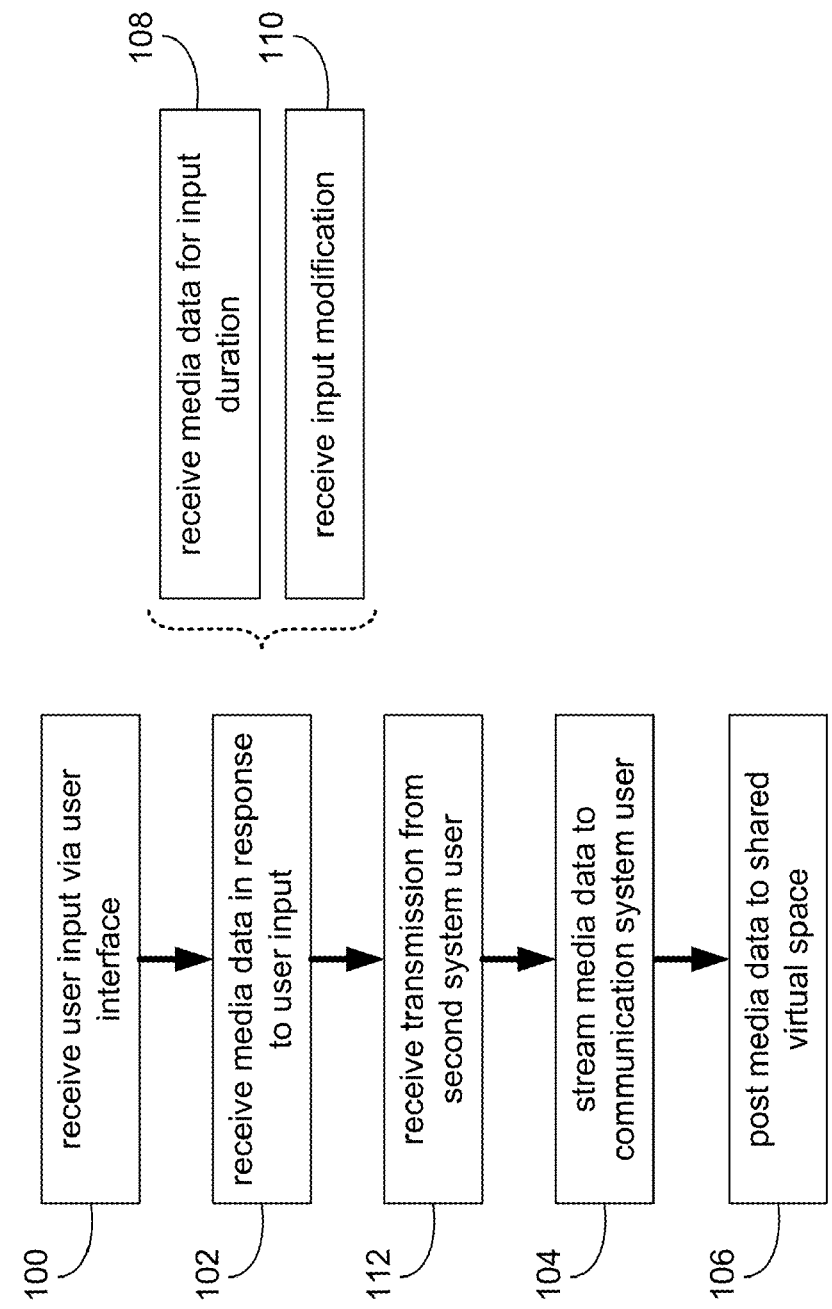
FIG. 2 is a flowchart of a process that may be executed by the communication process of FIG. 1.

Referring also to FIG. 2, communication process 10 may receive 100 a user input via a user interface. Communication process 10 may also receive 102 media data in response to receiving the user input. Communication process 10 may also stream 104 the media data to one or more communication system users. Communication process 10 may further post 106 the media data to a shared virtual space associated with a communication system channel.

Figure 3:
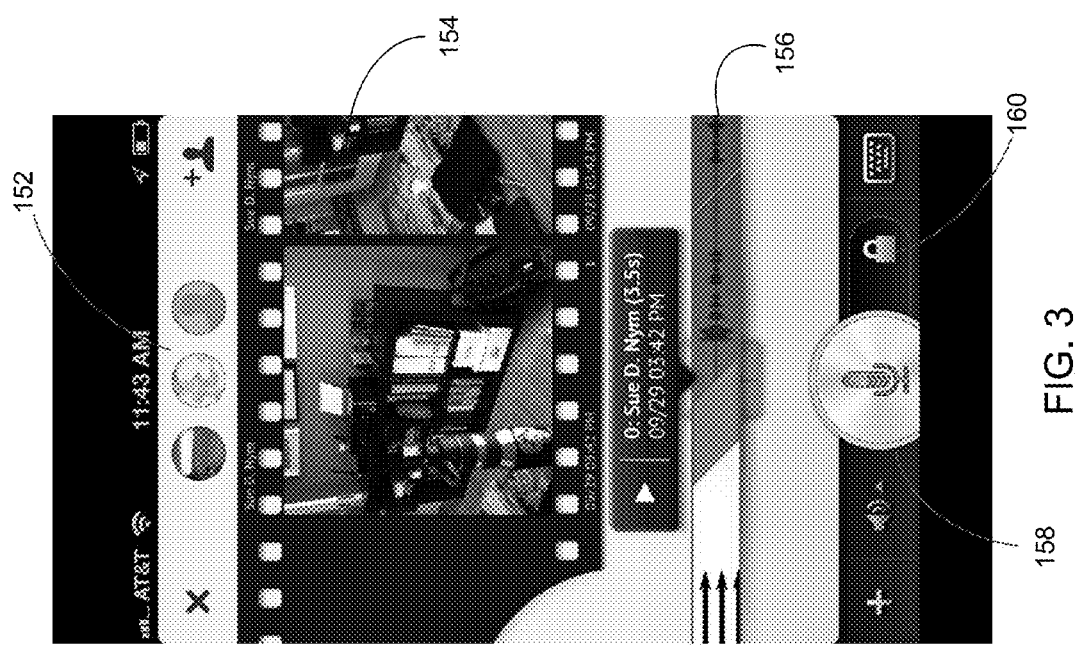
FIG. 3 graphically depicts a user interface that may be generated, at least in part, by the communication process of FIG. 1.

For example, communication process 10 may receive 100 a user input via a user interface. Referring also to FIG. 3, communication process 10 may provide user interface 150. In an embodiment, user interface 150 may generally include an indicator 152 of one or more other users of the communication system that may be associated with the channel of the communication system and/or who may be actively participating in an exchange. Similarly, user interface 150 may include visual media interface 154, via which visual media content associated with the call may be displayed, accessed, and/or otherwise interacted with by user 32 (i.e., the device operator of smart phone 12 of the illustrative example). User interface 150 may also include audio media interface 156, via which audio media content associated with the call may be accesses and/or interacted with by a user 32. Further, user interface 150 may include audio capture button 158, e.g., which may be utilized for creating and sharing audio content with other participants of the call one the communication channel.

In an embodiment, the media data may include audio media data. Continuing with the illustrative example, user 32 may which to generate a short voice message. Accordingly, user 32 may touch audio capture button 158. In response to user 32 touching audio capture button 158, communication process 10 may receive 102 media data (e.g., audio media data in the instant example in which the media data may include audio media data). In the illustrative example, smart phone 12 may include a touch screen display. Accordingly, smart phone 12 may receive one or more user inputs in response to a user touching a portion of the touch screen display associated with a virtual button (such as audio capture button 158) displayed on the touch screen display of smart phone 12. It will be appreciated that other user input devices may be utilized. For example, trackpad input devices, mouse pointing devices, or the like may be utilized in connection with other computing devices.

As mentioned above, communication process 10 may also receive 102 media data in response to receiving the user input. For example, in response to user 32 touching audio capture button 158, smart phone 12 may capture an audio input, e.g., utilizing a microphone or other audio capture functionality associated with smart phone 12. In an embodiment, the user input may include an associated input duration time period. That is, user 32 may touch audio capture button 158 for an input duration time period. Receiving 102 the media data may include receiving 108 the media data for the input duration (e.g., communication process 10 may receive 108 the media data for as long as user 32 is touching audio capture button 158). That is, for example, user 32 may press and hold audio capture button 158 for a period of time during which user 32 wishes to create and share the audio message. Accordingly, user 32 may press and hold audio capture button 158 while user 32 is creating the audio content (e.g., speaking into a microphone associated with smart phone 12, or recording a sound with smart phone 12, etc.) that user 32 wished to share with the other users of the communication system. For example, if user 32 wishes to share a voice message with the other users of the communication system, user 32 may press audio capture button 158 and may hold audio capture button while user 32 is speaking the voice message. Upon completing the voice message (and/or the portion of the voice message that user 32 is instantly creating, e.g., with further portions of the voice message to be subsequently created) user 32 may release audio capture button 158. Accordingly, for the input duration time period during which user 32 is holding audio capture button 158, communication process 10 may receive 108 the media data for that input duration.

Communication process 10 may also stream 104 the media data to one or more communication system users. For example, streaming 104 the media data may include transmitting the media data to at least a second communication system user as a low latency, packetized data transmission. In an embodiment, communication process 10 may stream 104 the media data to at least the second communication system user as the media data is being received 102 by communication process 10. In one such embodiment, communication process 10 may stream 104 the media data in real-time while the media data is being received 102 by communication process. As such, the second communication system user may receive the media data in real-time (and/or near real-time) as user 32 is creating the voice message, in the illustrative example (and/or other media data being created in other embodiments). In some embodiments, communication process 10 may stream 104 the media data to the second communication system user after the entirety of the media data has been received (e.g., after user 32 releases audio capture button 158). Streaming 104 the media data to the second communication system user after user 32 releases audio capture button 158 (perhaps long after) may in some instances occur when the second user is not online when user 32 initially captures the audio data (e.g., during asynchronous communication between user 32 and the second user). Streaming 104 the media data to the second user after the entirety of the media data has been received may also occur in other circumstances.

Communication process 10 may further post 106 the media data to a shared virtual space associated with a communication system channel. As generally discussed above, the shared virtual space may include a network accessible storage, such as an online shared folder, a cloud-based data repository, or the like. In an embodiment, the shared virtual space may be accessible by one or more users of the communication system. In an embodiment, posting 106 the media data to the shared virtual space may include storing the media data to the shared virtual space in a suitable file format that may permit access to the stored media data by one or more of the users of the communication system. In an embodiment, posting 106 the media data to the shared virtual space may include associating an identifier of the creator or creators (e.g., in an embodiment, in which the media data may include a combination of media data created by more than one user) of the media data with the stored media data. In an embodiment, the identifier associated with the media data may include a tag, or other Meta data associated with the filed including the media data.

Further, in some embodiments, the posting 106 the media data to the shared virtual space may include associating the media data with a particular call and/or interaction. In an embodiment, a call on the communication system may include an explicitly defined entity. For example, a user of the communication system may begin a call with one or more other users of the communication system. Beginning a call may include an explicit action to call the one or more other users. In some embodiments, beginning the call may result from a user responding to or adding to a post that may already exist in the communication system channel. Further, one or more of the users of the communication system may explicitly end the call. The call may include the interactions that occur between the users of the communication system between the time that the call begins until the call ends. In an embodiment, a call on the communication system may include a time bounded sequence of exchanges. For example, a sequence of exchanges may be grouped as a single call of a maximum time between each of the exchanges is less than a threshold time. The media data may also be associated with a channel of the communication system. As also generally dis-cussed above, a channel may generally include a plurality of calls or interactions by, between, and/or including a defined default group of participants as contributors and/or recipients of the interactions. As also generally discussed above, the interactions may include the exchange, dissemination, broad-cast, and/or sharing of a variety of media types across a variety of modalities, and temporal domains. In an embodiment, the media data may be associated with the channel by virtue of being associated with a given call (e.g., which may be associated with the channel). In other embodiments, a direct association between the media data and the channel may be created. For example, a tag, or other metadata, may be associated with the media data, which may associated the media data with the channel. According to any various embodiments, the media data may be associated with the channel on the communication system, and/or may be associated with a particular call on the channel, and/or may be associated with a particular user of the communication system.

In an embodiment, posting 106 the media data to the shared virtual space may include posting 106 the media data to the shared virtual space generally simultaneously with streaming 104 the media data to at least the second user of the communication system. In such an embodiment, the media data may be posted generally in real-time with the creation of the media data. As such, in some embodiments the media data may be accessible by a user accessing the shared virtual space generally in real-time with the creation of the media data.

According to an example embodiment, posting 106 the media data to the shared virtual space may include streaming the media data to the shared virtual space (e.g., streaming the media data to the shared virtual space as a recipient and/or to a process that may capture the media data and save the media data to the shared virtual space). In one such embodiment, communication process 10 may multi-cast the media data to at least the second user of the communication system and to the shared virtual space. In another example embodiment, streaming 104 the media data to at least the second user of the communication system and posting 106 the media data to the shared virtual space may include streaming the media data to a process (e.g., the server-side communication process), which may, e.g., stream the media data to at least the second user and save the media data to the shared virtual space. Various additional/alternative embodiments may be equally utilized.

As described above, in an embodiment the user input may include an associated input duration time period. Further, receiving 102 the media data may include receiving 108 the media data for the input duration. As such, in the described embodiment user 32 may create and share the media data as long as audio capture button 158 is pressed. In some instances it may be desirable to continue capturing audio media data without the need to continue pressing audio capture button 158. For example, user 32 may wish to be able to capture audio media via with hands-free operation (e.g., to allow the user to better direct a microphone of smart phone 12 toward a source of sound to be shared, to allow user 32 to perform another activity with his hands, etc.). In an embodiment, communication process 10 may receive 110 an input modification. Further, communication process 10 may receive the media data in response to the input modification including receiving the media data for a time period greater than the input duration. For example, as generally described above, communication process may receive 102 the media data for as long as the user input is received 100. In response to receiving 110 the input modification, communication process 10 may continue to receive 102 the media data even after the input is no longer being received. According to an embodiment, the input modification may lock the user input to allow communication process 10 to continue to receive the media data.

For example, in user interface 150 depicted in FIG. 3, user 32 may press audio capture button 158 to capture audio media data as long as audio capture button 158 is being pressed. In an embodiment, user 32 may invoke the input modification as a swiping gesture associated with audio capture button 158. For example, the swiping gesture may include pressing audio capture button 158 and, with audio capture button 158 pressed, executing a sliding motion with the finger pressing audio capture button 158 laterally, e.g., toward pad lock icon 160 in a left-to-right direction. In the illustrative example, the sliding gesture of audio capture but-ton 158 toward pad lock icon 160 may be received 110 as an input modification which may "lock" the audio capture on, thereby causing communication process 10 to receive 102 audio media data for a time period greater than the input duration (e.g., longer than the time period for which audio capture button 158 is pressed).

In an embodiment, communication process 10 may receive 102 audio media data in response to receiving 102 the user input and further in response to receiving 110 the input modification. Further, communication process 10 may stream 104 and post 106 the media data, as generally described above, for as long as communication process 10 may continue to receive 102 the media data. In an embodi-ment, communi-cation process 10 may continue to receive 102 the media data until the input modification is released. According to various embodiments, user 32 may release the input modification (i.e., the "locked" audio capture button in the illustrative example) by swiping in the opposite direction as employed to "lock" audio capture button 158 (e.g., in a right to left direction in illustrated user interface 150). In another embodiment, user 32 may "unlock" audio capture button 158 (thereby causing communication process to stop receiving media data) by pressing the central, or normal, position of audio capture button 158. Various additional/ alternative mechanism for stopping the continuous capture of media data may be utilized.

As discussed above, communication process 10 may receive 102, stream 104, and post 106 media types in addition/as an alternative to audio media data. In an example embodiment, the media data may include visual media data. According to such an example, communication process 10 may receive 100 a user input to capture visual media, such as digital pictures, e.g., via digital camera functionality associated with smart phone 12. Other computing devices may capture digital pictures with camera functionality incor-porated into the computing device and/or via other devices associated with the computing device (such as a web cam-era, or the like). In an example embodiment, rotating smart phone 12 from a portrait orientation (e.g., with the longitu-dinal axis of smart phone 12 generally oriented in a vertical direction) to a landscape orientation (e.g., with the longitu-dinal axis of smart phone 12 generally oriented in a hori-zontal direction) may enable visual media capture function-ality associated with communication process 10. Visual media capture functionality may also be otherwise enabled. When visual capture functionality is enabled, at least a portion of the display of smart phone 12 may act as a viewfinder, depicting the field of view of a digital camera associated with smart phone 12. In one such embodiment, user 32 may tap any portion (and/or a designated portion or feature) of the viewfinder display to cause communication process 10 to receive 100 a user input via a user interface. In response to receiving 100 the user input (i.e., a tap on a viewfinder display), communication process 10 may receive 102 media data in the form of a single digital picture. In such an embodiment, each time user 32 taps the viewfinder display, communication process 10 may receive 102 media data corresponding to a single digital picture (e.g., in which the duration for which communication process 10 may receive the visual media data may generally correspond to a time period of the user input). It will be appreciated that other user inputs may equally be utilized for capturing digital images.

Continuing with the above example, communication pro-cess 10 may receive 100 a user input in which the user input includes an associated input duration time period. Further, communication process 10 may receive 102 the media data for the input duration. As described above, user 32 may tap the viewfinder display associated with the user interface. Each time user 32 taps the viewfinder display (and/or a designated portion or feature of the viewfinder display) communication process 10 may receive 100 a user input and may receive 102 media data in the form of a single digital picture for each tap, e.g., based on, at least in part, the input duration. Further, in some instances user 32 may touch the viewfinder display for an extended time period (e.g., a time period longer than a tap). In an embodiment, in response to an extended touch communication process 10 may receive 102 visual media data for the input duration. Receiving 102 visual media data for an input duration associated with an extended touch may include receiving 102 visual media input data as a burst of digital pictures. In some embodi-ments, communication process 10 may receive 102 the burst of digital pictures for as long as user 32 continues the touch of the viewfinder display. In other embodiments communi-cation process 10 may receive 102 the visual media data in the form of a burst of digital pictures including a predeter-mined number of pictures (e.g., a five picture burst, etc.). In some embodiments, communication process 10 may stream 104 and or post 106 the media data including a burst of digital pictures as a series of discrete images, and/or as an animation including the discrete images of the burst. In some embodiments, communication process 10 may receive 102 visual media data in response to an extended touch as a video clip having a duration that may be based on, at least in part, the length of the user input touch on the viewfinder display. Other embodiments may similarly be utilized.

Figure 4:
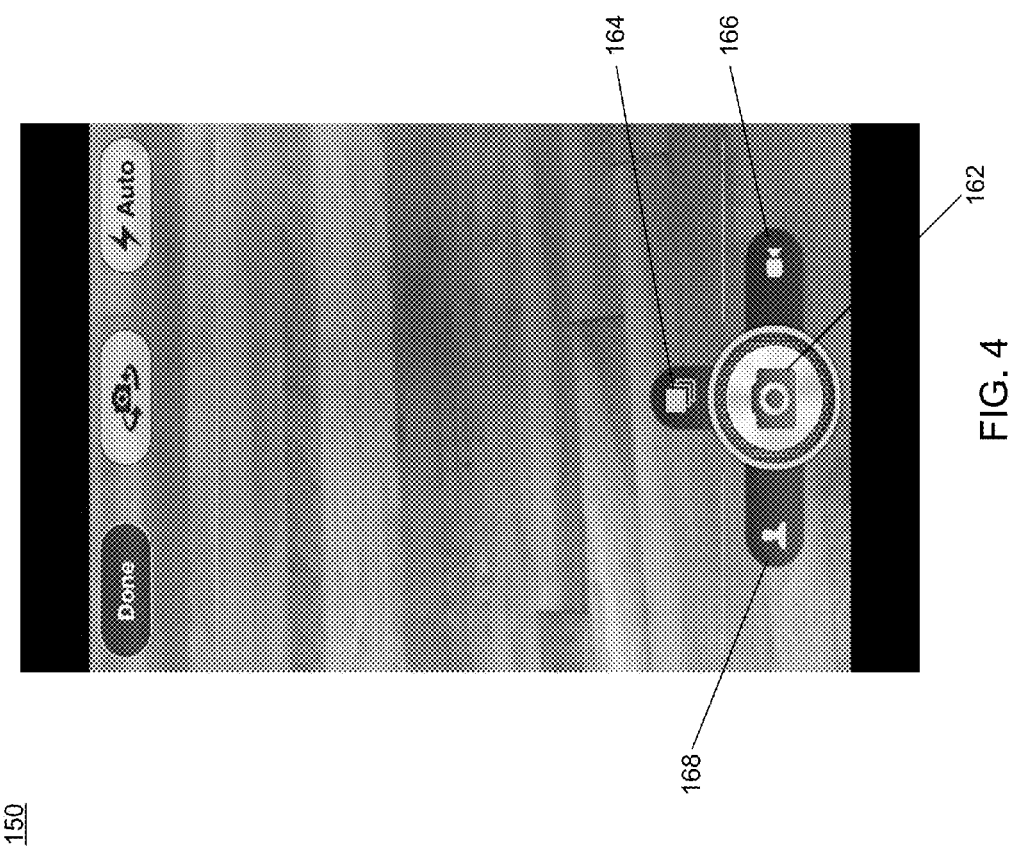
FIG. 4 graphically depicts a user interface that may be generated, at least in part, by the communication process of FIG. 1.

In an example embodiment, communication process 10 may receive 110 an input modification. Further, communi-cation process 10 may receive 102 the media data in response to the input modification including receiving the media data for a time period greater than the input duration. In the example embodiment in which the user input may include a touch within the viewfinder display, an example of an input modification may include a touch and slide gesture. For example, and referring also to FIG. 4, in such an embodiment user 32 may touch the display within the viewfinder display and may then slide his finger across the display, e.g., in a horizontal direction or in a vertical direction. For example, user 32 may touch camera icon 162 within the display and may slide icon 162 to provide an input modification. In an embodiment, in response to receiving 110 a touch and slide input modification, communication process 10 may receive 102 the media data for a time period greater than the duration of the input. For example, the touch and slide input modification may cause communication process 10 to receive visual media data in the form of a burst of digital picture or a video recording. In an embodiment, the video recording may continue until stopped by user 32 (e.g., utilizing a cancel gesture such as another touch input on the viewfinder display, etc.). Communication process 10 may generally stream 104 and post 106 the video media data as generally discussed herein above.

In the foregoing example in which the input modification may include a touch and slide gesture, it will be appreciated that different input modifications may be received 110 depending upon the direction of the slide gesture. For example, in an embodiment, user 32 may slide camera icon 162 upwards (in the depicted embodiment) toward icon 164 to invoke a burst picture mode (e.g., as an additional or alternative embodiment to the above-described burst picture mode). The touch and upward slide of camera icon 162 towards burst icon 164 may cause communication process 10 to receive a first input modification. In an embodiment, the first input modification may cause communication process 10 to receive visual media data in the form of multiple digital photographs (e.g., take at predetermined time intervals), for example every time user 32 taps the display of smart phone 12. Further, user 32 may touch and slide camera icon 162 to the side (e.g., either to the left or to the right). For example, in an embodiment a touch and slide gesture in which the slide is in a left to right direction (e.g., sliding camera icon 162 toward video icon 166) may cause communication process 10 to receive 102 video media data from a first camera (e.g., a rear facing camera) associated with smart phone 12. In a related manner, a touch and slide gesture in which the slide is in a right to left direction (e.g., sliding camera icon 162 towards video conference icon 168) may cause communication process 10 to receive 102 video media data from a second camera (e.g., a front facing camera) associated with smart phone 12. Other input modifications may result in different functionality being expressed by communication process. Further, it will be appreciated that other user inputs and other input modifications may be utilized without materially departing from the disclosure.

In an embodiment communication process 10 may receive 112 a transmission from a second communication system user. The transmission from the second communication system user may include, for example, a streaming media data transmissions, such as an audio media data transmission (e.g., an audio clip, voice message, etc.) or a visual media data transmission (e.g., a picture, an animation, a video clip, etc.). In an embodiment, the transmission received 112 from the second communication system user may not time-wise over-lap with streaming 104 the media data received 102 by communication process 10 based on a received 100 user input (e.g., as discussed above). That is, receipt 112 of the transmission from the second communication system user may not begin during, or extend through a time period during which communication process 10 may stream 104 media data. In such an embodiment, streaming 104 the media data by communication process 10 and receiving 112 the transmission from the second communication system user may occur as time-wise separate events.

In an embodiment in which the received 112 transmission from the second communication system user does not time-wise overlap with streaming 104 the media data, posting 106 the media data may include sequentially posting the media data with respect to a post associated with the trans-mission from the second communication system user. For example, in a manner as generally discussed above, media data received by communication process 10 may be posted 106 to the shared virtual space associated with a communication system channel. Similarly, media data from the second communication system user may be posted to the shared virtual space associated with the communication channel. In an embodiment in which the streaming media data from user 32 does not overlap in a time-wise manner with a transmission from a second communication system user, communication process 10 may post 106 the media data from user 32 as a separate post from the media data transmitted by the second communication system user. Further, the post of the media data from user 32 and the post associated transmission from the second communication system user may be sequentially ordered on the shared virtual space based on a respective time at which each occurred.

In an example embodiment, receiving 112 the transmission from the second communication system user may time-wise overlap with streaming 104 the media data. For example, the transmission received 112 from the second communication system user may begin before streaming 104 the media data from user 32 is complete. In a similar manner, communication process 10 may receive 112 a transmission from the second communication system user (e.g., which may include streaming media data) that may not be complete (e.g., communication process 10 may still be receiving 112 the transmission from the second communication system user) when communication process 10 begins streaming 104 media data from user 32. According to such embodiments, communication process 10 may be simultaneously streaming 104 media data from user 32 and receiving a transmission from a second communication system user for at least a portion the time period during which communication process 10 is streaming media data from user 32.

In an embodiment in which the media type being streamed 104 by communication process 10 and being received 112 from the second communication system user include the same media type (e.g., both include audio media data or both include video media data) streaming 104 the media data may include combining the media data and the transmission from the second communication system user as a multi-directional streaming media data transmission. For example, assume that the media data being streamed 104 from user 32 includes streaming audio (such as a voice message), and the transmission received 112 from the second communication system user also include audio (such as a voice message), communication process 10 may stream 104 the media data from user 32 including combining the media data and the transmission being received as a multi-directional voice communication (such as a voice-over-IP session, or other telephony session). As such, user 32 and the second communication system user may engage in a generally real-time bi-directional (or multi-directional in the even that other communication system users simultaneously transmitting the same media type) conversation. In a similar manner, if the media type being streamed 104 from user 32 and being received from the second communication system user both include video data, streaming 104 the media data from user 32 may include combining the streaming media and the received transmission as a video conference.

In a generally similar manner, in an embodiment in which receiving 112 the transmission from the second communication system user may time-wise overlap with streaming 104 the media data, posting 106 the media data may include posting 106 the media data and the transmission from the second communication system user as a combined media data post within the shared virtual space. For example, in a manner that is generally analogous to combining the streaming media data and the transmission from the second communication system user into a single multi-directional conversation or exchange, the posts associated with the media data from user 32 and with the transmission from the second communication system user may include a single post including the combined content of the media data from user 32 and the media data from the second communication system user. In an embodiment, the post including the combined media data from user 32 and the transmission from the second communication system user may include an associated indicator (e.g., a tag or other metadata) indicating that the post includes content from both user 32 and from the second communication system user.

Figure 5:
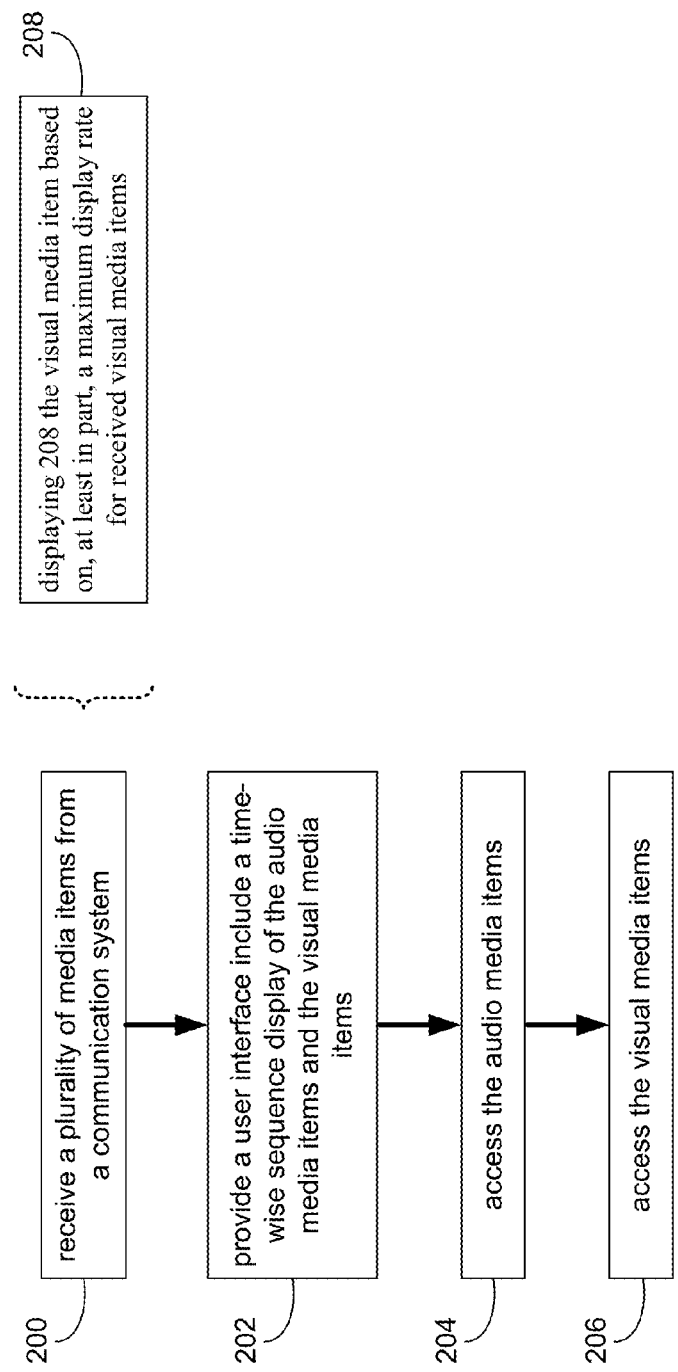
FIG. 5 is a flow chart of a process that may be executed by the communication process of FIG. 1.

Referring also to FIG. 5, in an embodiment, in an embodiment communication process 10 may receive 200 a plurality of media items from a communication system. The plurality of media items may include at least audio media items and visual media items. Communication process 10 may also provide 202 a user interface including a time-wise sequence display of the audio media items and a time-wise sequence display of the visual media items. Communication process 10 may also access 204 the audio media item including sequencing the display of the visual media items based on the display of the audio media items. Communication process 10 may further access 206 the visual media items including sequencing the display of the visual media items independently of the display of audio media items.

For example, and as generally described above, in some embodiments the communication system may allow users of the system to interact with one another via various different media types and over various temporal domains. For example, users may interact via audio media types, such as audio clips, voice messages, interactive conversations between multiple users, and the like. Similarly, users may interact with one another via visual media communications, which may include, for example, still images, animated images, video clips, video conferences between multiple users, text messages or text posts, documents, maps, drawings, and the like. Further, according to various embodiments, media items may be transmitted between users as steaming media items (e.g., which may allow for low latency and/or real-time or near real-time communications between users), as well as transmission of media files. The various media items may be transmitted by one user to one or more other users of the communication system. Accordingly, communication process 10 may receive 200 a plurality of media items from a communication system. The plurality of media items may include at least audio media items and visual media items.

In an embodiment, the audio media items may include a plurality of audio segments corresponding to respective audio transmissions by one or more users associated with a channel of the communication system. For example, each of the audio segments may include a separate voice message or audio media file transmitted to a user of the communication system (e.g., user 32 for example) and received 200 by communication process 10. Further, and as mentioned above, in some embodiments the audio media items may include audio associated with interactive conversation between multiple users. In such an embodiment, at least a portion of the audio segments may correspond to a multi-party conversation. For example, the multi-party conversation may include a multi-party conversation that took place between the parties using the communication system, which may provide voice-over-IP or other audio telephony functionality. Each of the audio segments associated with the multi-party conversation may include audio generated by each respective participant in the multi-party conversation. For example, every time that a participant in the conversation speaks, an audio segment may be generated and may be received 200 by communication process 10.

In some embodiments the individual audio segments may be based on, at least in part, audio "whitespaces" created in the audio media. For example, while creating a voice message (or other audio media) user 32 may pause (or otherwise cause a decrease in the audio signal, such as volume, received 200 by communication process 10) for greater than a threshold time period, thereby creating an audio "whitespace." Communication process 10 may segment the audio media based on the detection of such a whitespace. That is, communication process 10 receive 200 a first audio segment corresponding to the audio media preceding the whitespace and may receive 200 a second audio segment corresponding to the audio media following the whitespace. In a generally similar manner, during a multi-party conversation between two or more users (e.g., which may be provided via a voice-over-IP or other telephony provided by communication system 10), any given audio segment may include more than one creator, such as when two users speak at the same time, a second user begins speaking in less than the threshold whitespace time after the first user stops speaking. As such, communication system 10 may receive 200 audio media including an audio segment of which both the first user and the second user are creators. Further, after the second user speaks, both the first and second user (as well as any other user participating in the multi-party conversation) may remain silent (and/or generate a decreased audio signal) for a time period equal to, or greater than, the threshold whitespace time period. In such an embodiment, when a user begins speaking after the threshold whitespace time period, communication process 10 may receive 200 another audio segment that may include one or more creators.

In an embodiment, the multi-party conversation may include an ongoing multi-party conversation. As such, at least a portion of the audio media items may include audio segments from the ongoing multi-party conversation. As the conversation may include an ongoing conversation, as participants in the conversation continue to speak with one another, communication process 10 may receive 200 additional media items including audio segments associated with the current state of the ongoing conversation. As generally described above, the various audio segments may be received 200 based on an per-creator basis (e.g., a separate audio segment may be created every time a different user speaks or otherwise creates audio media) or on a whitespace basis (e.g., in which a separate audio segment is created every time an audio whitespace equal to or greater than a threshold whitespace time period occurs).

Figure 6:
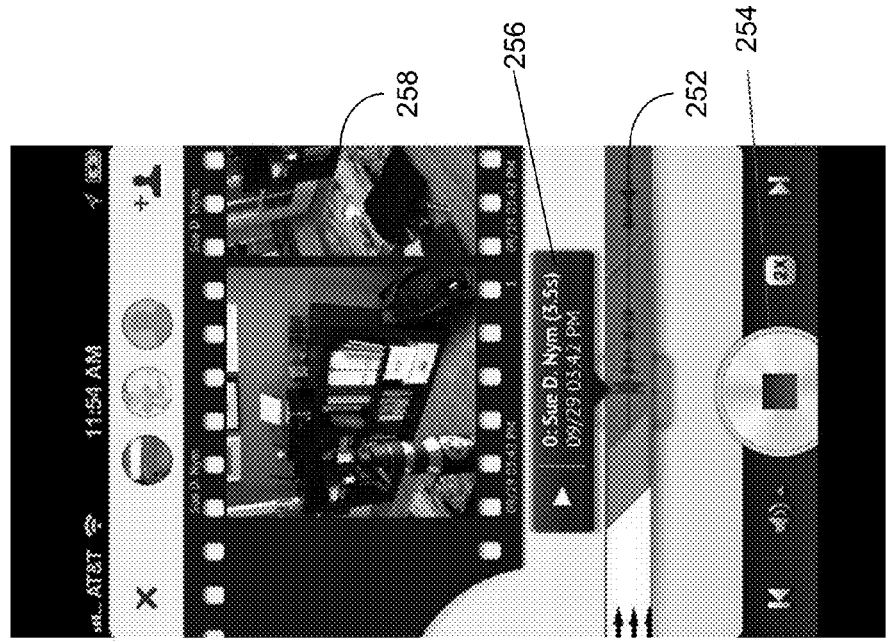
FIG. 6 graphically depicts a user interface that may be generated, at least in part, by the communication process of FIG. 1.

Communication process 10 may also provide 202 a user interface including a time-wise sequence display of the audio media items and a time-wise sequence display of the visual media items. For example, and referring also to FIG. 6, communication process 10 may provide 202 user interface 250. User interface 250 may include audio track display 252, which may include a time-wise sequence display of the audio media items. For example, in the illustrated embodiment, the audio track display 252 is depicted as a segment of audio tape having audio waveforms depicted thereon. In the illustrated user interface the audio waveforms may correlate to individual audio segments received 200 by communication process. In an embodiment, user 32 may traverse audio track display 252 to access audio segments that occurred later in time and/or earlier in time with respect to one or more currently displayed audio segments.

In an embodiment, user 32 may traverse audio track display 252 by scrolling laterally, for example by executing a side-to side swipe gesture across the representation of audio track display 252 on a touch screen display associated with smart phone 12. In an embodiment, a left to right swipe gesture may scroll audio track display 252 to the left, allowing user 32 to view audio segments that occurred earlier in time. In a generally corresponding manner, a right to left swipe gesture may scroll audio track display 252 to the right, allowing user 32 to view audio segments that occurred later in time. User 32 may access (e.g., listen to) an audio segment by selecting (e.g., by touching, clicking on, etc.) a representation of an audio segment displayed within audio track display 252. Further, in a situation in which user 32 may be displaying and/or accessing an audio segment within audio track display 252 that has an associated creation time at an earlier time, user 32 may select "stop" button 254. Selecting "stop" button 254 may traverse audio track display 252 to display a most currently received 200 audio media item. In a situation in which communication process 10 may be receiving 200 streaming audio media when user 32 selects "stop" button 254, communication process 10 begin playing the streaming audio media in real-time. It will be understood that various additional/alternative displays may be implemented for providing a time-wise sequence display of audio media items. For example, user 32 may also return to a most current portion of the audio media data by simply allowing the recorded audio media data (represented in audio track display 252) to play out (e.g., play from a selected portion until all recorded audio media from the selected audio media data until the last received audio media data), and/or may traverse audio track display 252 to the most recently received audio media data. Further, various additional/alternative controls may be pro-vided for playing back and/or accessing audio media items (e.g. controls to skip forward or backward, fast-forward and rewind, etc.).

In an embodiment, the individual audio segments may arranged within audio track display 252 in a time-wise sequence in which the individual audio segments may be arranged based on the time at which the audio segment was created. In an embodiment in which one or more of the audio segments may not have been received 200 by communication process 10 in real-time with the creation of the audio segment, the audio segment may be time-wised sequenced with the other audio segments displayed in audio track display 252 based on creation time data associated with the audio segment. The creation time data associated with the audio segment may include metadata associated with the audio segment. In addition to using the metadata associated with the audio segment for time-wise sequencing the audio segment with respect to other audio segments, in some embodiments communication process 10 may display metadata associated with an audio segment currently selected within audio track display 252. For example, communication process 10 may display tag 256, which may include, for example, an identification of the one or more creators of the audio segment, a duration time of the audio segment, and a creation time of the audio segment. Tag 256 may include additional and/or alter-native information.

In a generally corresponding manner, communication process 10 may provide also 202 a user interface including a time-wise sequence display of the visual media items. For example, user interface 250 may include visual track display 258. Visual track display 258 may include a plurality of images based on and/or representative of individual visual media items. For example, each image within visual track display 258 may include a visual media item scaled in size to fit within visual track display 258. In an embodiment in which a visual media item may include a video media item and/or an animated visual media item, the image within visual track display 258 may include a representative image, such as an initial image of a video media item or animated visual item. Other representative images may similarly be employed. Further, in a generally similar manner as discussed with respect to the user interface associated with audio media items, visual media items may be arranged within visual track display 258 in a time-wise sequenced arrangement based on a creation time of each respective visual media item. While not shown, each visual media item may include associated creator(s), creation time, etc., metadata. In some embodiments, at least a portion of the metadata and/or information based on, at least in part, the metadata may be displayed within user interface 250. Further, and also in a manner as generally described with respect to the audio media items, user 32 may access visual media items from earlier and/or later creation times with respect to a currently displayed visual media item, e.g., via a side-to-side swipe gesture executed over visual track display 258.

Communication process 10 may also access 204 the audio media item including sequencing the display of the visual media items based on the display of the audio media items. For example, as discussed above, user 32 may traverse audio track display 252 to access audio segments from previous period of time, such as through the user of a left-to-right swipe gesture across audio track display 252 in the illustrated example embodiment. Further, communication process 10 may access 204 an audio media item, e.g., from a previous period of time, by selecting the audio waveform associated with the previous audio media item from within audio track display 252. In an embodiment, accessing 204 the audio media item may include sequencing the display of the visual media items based on the display of the audio media items. For example, in response to user 32 accessing 204 an audio segment from an earlier period of time, communication process 10 may display, e.g., within visual track display 258, one or more visual media items having a creation time that may at least generally correspond to the creation time of the accessed 204 audio media item. Consistent with the foregoing example, when user 32 listens to an audio segment from a prior time period visual media items from a generally corresponding time period may be displayed. In some embodiments, accessing audio media items may include accessing audio media items independently of video media items. That is, in some embodiments, user 32 may traverse audio track display 252 without a corresponding sequencing of visual track display 258 and/or items within visual track display 258.

As discussed above, the audio media items may, in some embodiments, include audio segments associated with an ongoing multi-party conversation. In such an embodiment, accessing 204 the audio media items may include accessing one or more audio segments associated with a prior portion of the ongoing multi-party conversation. Further, and as described above, communication process 10 may sequence the display of visual media items (e.g., may sequence visual track display 258) to display one or more visual media items having a creation time that may generally correspond to the prior portion of the ongoing multi-party conversation (e.g., to the extent that any generally corresponding visual media items may have been received 200).

In an embodiment, accessing 204 the audio media items may include accessing a streaming audio sequence associated with a current portion of the ongoing multi-party conversation. For example, and as generally discussed above, after accessing one or more audio segments associated with an earlier time period, user 32 may wish to return to a currently ongoing multi-party conversation, and/or access currently streaming audio media items. In such a situation, user 32 may select "stop" button 254. In response to user 32 selecting "stop" button 254, communication process may play currently streaming audio media items being received 200. Additionally, and as generally discussed, each audio segment may include an associated identifier of a creator, or more than one creators, of the audio segment, e.g., which may be displayed via tag 256 and/or via other suitable display.

As described above, in some embodiments access 204 an audio media item from a prior time period may include sequencing a display of visual media items to display visual media items that may have been created in the same general time frame as an audio media item being accessed. As such, user 32 may view visual media items generally corresponding in time to audio media items being accessed 204 (e.g., listened to). In some embodiments, user 32 may wish to view previously received visual media items without interrupting playback of audio media items and/or without interrupting streaming audio media items being currently received 200 by communication process 10. In an embodiment, communication process 10 may access 206 the visual media items including sequencing the display of the visual media items independently of the display of audio media items. For example, user 32 may sequence the display of the visual media items, e.g., via a side-to-side swipe gesture executed across visual track display 258. Executing a side-to-side swipe gesture across visual track display 258 may cause communication process 10 to access 206 visual media items, including sequencing the display of visual media items by displaying successively older or more recent visual media items (e.g., depending upon the direction of the swipe gesture) within visual track display 258. In an embodiment, accessing 206 visual media items may be independent of display of audio media items. As such, while communication process 10 may sequence the display of visual media items in response to the swipe gesture across visual track display 258, the audio media items displayed via audio track display 252 may not be sequenced. In some embodiments, traversing visual track display 258 may result in a corresponding sequencing of audio track display 252 (and/or audio media items represented within audio track display) to display and/or make accessible audio media items corresponding to at least a general time period associated with a visual media item displayed in the sequenced visual track display 252.

In an example embodiment, receiving 200 the visual media item may include displaying 208 the visual media item based on, at least in part, a minimum display time for received visual media items. For example, in some embodiments, communication process 10 may receive 200 a plurality of visual media items in relatively rapid succession. For example, a user of the communication system may take several digital pictures in a short time frame, such as in a burst. In an embodiment, the digital images may be streamed via the communication system and may be received in relatively rapid succession (e.g., based on the speed with which the images were taken and steamed). In some situations, the images may be received 200 so quickly that user 32 may not have time to view each individual picture before the next picture is received (e.g., in visual track display 258). In such a situation, while user 32 may have the ability to traverse the visual media items via visual track display 258, user 32 may not be aware of the number of images that have been received 200 by communication process 10, e.g., because the multiple pictures were received in quick succession. In an embodiment, communication process 10 may display 208 each received visual media item based on, at least in part, a mini-mum display time for received visual media items regardless of the rate at which the visual media items were received. For example, a minimum display time may include a two second display time (e.g., or other system or user selected display time). As such, each received 200 visual media item may be displayed for at least two seconds before the next visual media item is displayed, e.g., regardless of the rate at which the visual media items are received. As such, user 32 may have an opportunity to at least briefly view each visual media item before the next is displayed. User 32 may additionally, be able to better ascertain how many individual visual media items (e.g., digital pictures) were received 200, and may be better able to make a decision as to whether to go back through visual track display 258 and further view various visual media items.

Figure 7:
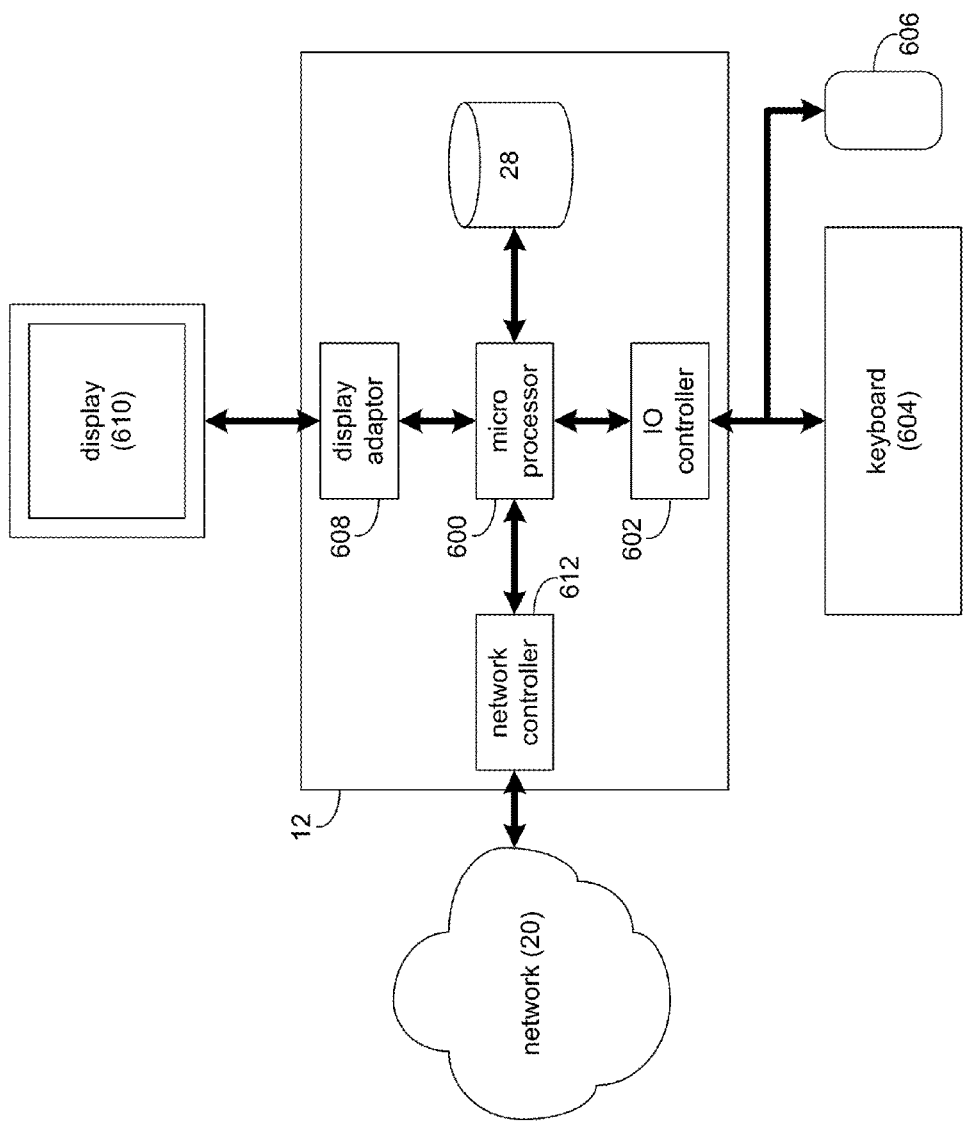
FIG. 7 is a diagrammatic view of the computing device of FIG. 1, according to an embodiment of the present disclosure.

Referring also to FIG. 7, there is shown a diagram-matic view of computing device 18. While computing device 18 is shown in this figure, this is for illustrative purposes only and is not intended to be a limitation of this disclosure, as other configurations are possible. For example, any computing device capable of executing, in whole or in part, communication process 10 may be substituted for smart phone 12 within FIG. 7, examples of which may include but are not limited to computing devices 12, 14, 16.

Computing device 18 may include microprocessor 600 configured to e.g., process data and execute instructions/code for communication process 10. Microprocessor 600 may be coupled to storage device 28. As discussed above, examples of storage device 28 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 602 may be configured to couple microprocessor 600 with various devices, such as keyboard 604, mouse 606, USB ports (not shown), and printer ports (not shown). Display adaptor 608 may be configured to couple display 610 (e.g., a CRT or LCD monitor) with microprocessor 600, while network adapter 612 (e.g., an Ethernet adapter) may be configured to couple microprocessor 600 to network 20 (e.g., the Internet or a local area network).

As will be appreciated by one skilled in the art, the present disclosure may be embodied as a method (e.g., executing in whole or in part on computing device 18), a system (e.g., computing device 18), or a computer program product (e.g., encoded within storage device 28). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 28) having computer-usable program code embodied in the medium.

Any suitable computer usable or computer readable medium (e.g., storage device 28) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intra-net, or a magnetic storage device. The computer-usable or computer-readable medium may also be paper or another suitable medium upon which the program is printed, as the program can be electronically captured, via, for instance, optical scanning of the paper or other medium, then com-piled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages, and/or in scripting languages such as JavaScript programming language or the Groovy programming language. Furthermore, various application programming interfaces (APis) and/or application development frameworks such as the Dojo or Grails development frameworks may be used in writing the computer program. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 20).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 600) of a general purpose computer/special purpose computer/other programmable data processing apparatus (e.g., computing device 18), such that the instructions, which execute via the processor (e.g., processor 600) of the computer or other programmable data processing apparatus, create means for implementing the functions/acts specified in the flowchart and/or block diagram block or blocks.

These computer program instructions may also be stored in a computer-readable memory (e.g., storage device 28) that may direct a computer (e.g., computing device 18) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 18) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow-chart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:
1. A computing apparatus comprising:
one or more computer readable storage media;
a processing system operatively coupled with the one or more computer readable storage media; and
a communication application stored on the one or more computer readable storage media and comprising pro- gram instructions that, when read and executed by the processing system, direct the processing system to at least:
  render a user interface to the communication application, the user interface comprising a visual media interface and an audio media interface;
  render visual media content associated with a multi-party conversation in the visual media interface; and
  render audio media content associated with the multi-party conversation in the audio media interface.

2. The computing apparatus of claim 1 wherein the visual media interface comprises a visual track display of the visual media content, and wherein the visual track display of the visual media content comprises a plurality of visual media items received by the communication application during the multi-party conversation.

3. The computing apparatus of claim 2 wherein the program instructions direct the processing system to sequentially arrange the plurality of visual media items in the visual track display based on a creation time of each of the plurality of visual media items.

4. The computing apparatus of claim 3 wherein the audio media interface comprises an audio track display of the audio media content, and wherein the audio track display of the audio media content comprises a plurality of audio segments received by the communication application during the multi-party conversation.

5. The computing apparatus of claim 4 wherein the program instructions direct the processing system to sequentially arrange the plurality of audio segments in the audio track display based on a creation time of each of the plurality of audio segments.

6. The computing apparatus of claim 5 wherein the visual media content comprises pictures captured during the multi-party conversation and uploaded to a virtual space associated with the multi-party conversation, and wherein the audio media content comprises audio recordings captured during the multi-party conversation and uploaded to the virtual space associated with the multi-party conversation.

7. One or more computer readable storage media having a communication application stored thereon for supporting multi-party conversations, the communication application comprising program instructions that, when read and executed by a processing system, direct the processing system to at least:
  render a user interface to the communication application, the user interface comprising a visual media interface and an audio media interface;
  render visual media content associated with a multi-party conversation in the visual media interface; and
  render audio media content associated with the multi-party conversation in the audio media interface.

8. The one or more computer readable storage media of claim 7 wherein the visual media interface comprises a visual track display of the visual media content, and wherein the visual track display of the visual media content comprises a plurality of visual media items received by the communication application during the multi-party conversation.

9. The one or more computer readable storage media of claim 8 wherein the program instructions direct the processing system to sequentially arrange the plurality of visual media items in the visual track display based on a creation time of each of the plurality of visual media items.

10. The one or more computer readable storage media of claim 9 wherein the audio media interface comprises an audio track display of the audio media content, and wherein the audio track display of the audio media content comprises a plurality of audio segments received by the communication application during the multi-party conversation.

11. The one or more computer readable storage media of claim 10 wherein the program instructions direct the processing system to sequentially arrange the plurality of audio segments in the audio track display based on a creation time of each of the plurality of audio segments.

12. The one or more computer readable storage media of claim 11 wherein the visual media content comprises pictures captured during the multi-party conversation and uploaded to a virtual space associated with the multi-party conversation, and wherein the audio media content comprises audio recordings captured during the multi-party conversation and uploaded to the virtual space associated with the multi-party conversation.

13. A method of operating a computing device in support of a communication application, the method comprising:
  displaying a user interface to the communication application, the user interface comprising a visual media interface and an audio media interface;
  displaying visual media content associated with a multi-party conversation in the visual media interface; and
  displaying audio media content associated with the multi-party conversation in the audio media interface.

14. The method of claim 13 wherein the visual media interface comprises a visual track display of the visual media content and wherein the method further comprises displaying the visual media content sequentially according to time along the visual track display.

15. The method of claim 14 wherein the audio media interface comprises an audio track display of the audio media content and wherein the method further comprises displaying the audio media content sequentially according to time along the audio track display.

16. The method of claim 15 wherein the visual media content comprises pictures captured during the multi-party conversation and uploaded to a virtual space associated with the multi-party conversation, and wherein the audio media content comprises audio recordings captured during the multi-party conversation and uploaded to the virtual space associated with the multi-party conversation.

17. The computing apparatus of claim 4, wherein each sequential audio segment of the plurality of audio segments is separated from a corresponding previous audio segment of the plurality of audio segments based on a decreased audio volume in the multi-party conversation being detected for greater than a threshold time period between each sequential audio segment of the plurality of audio segments and each corresponding previous audio segment of the plurality of audio segments.

18. The computing apparatus of claim 4, wherein each sequential audio segment of the plurality of audio segments is separated from a corresponding previous audio segment of the plurality of audio segments based on audio being received during the multi-party conversation, by the communication application, from a different computing device than a computing device from which audio corresponding to a previous audio segment was received.

19. The one or more computer readable storage media of claim 10, wherein each sequential audio segment of the plurality of audio segments is separated from a corresponding previous audio segment of the plurality of audio segments based on a decreased audio volume in the multi-party conversation being detected for greater than a threshold time period between each sequential audio segment of the plurality of audio segments and each corresponding previous audio segment of the plurality of audio segments.

20. The one or more computer readable storage media of claim 10, wherein each sequential audio segment of the plurality of audio segments is separated from a corresponding previous audio segment of the plurality of audio segments based on audio being received during the multi-party conversation, by the communication application, from a different computing device than a computing device from which audio corresponding to a previous audio segment was received.

* * * * *